Figure 1:
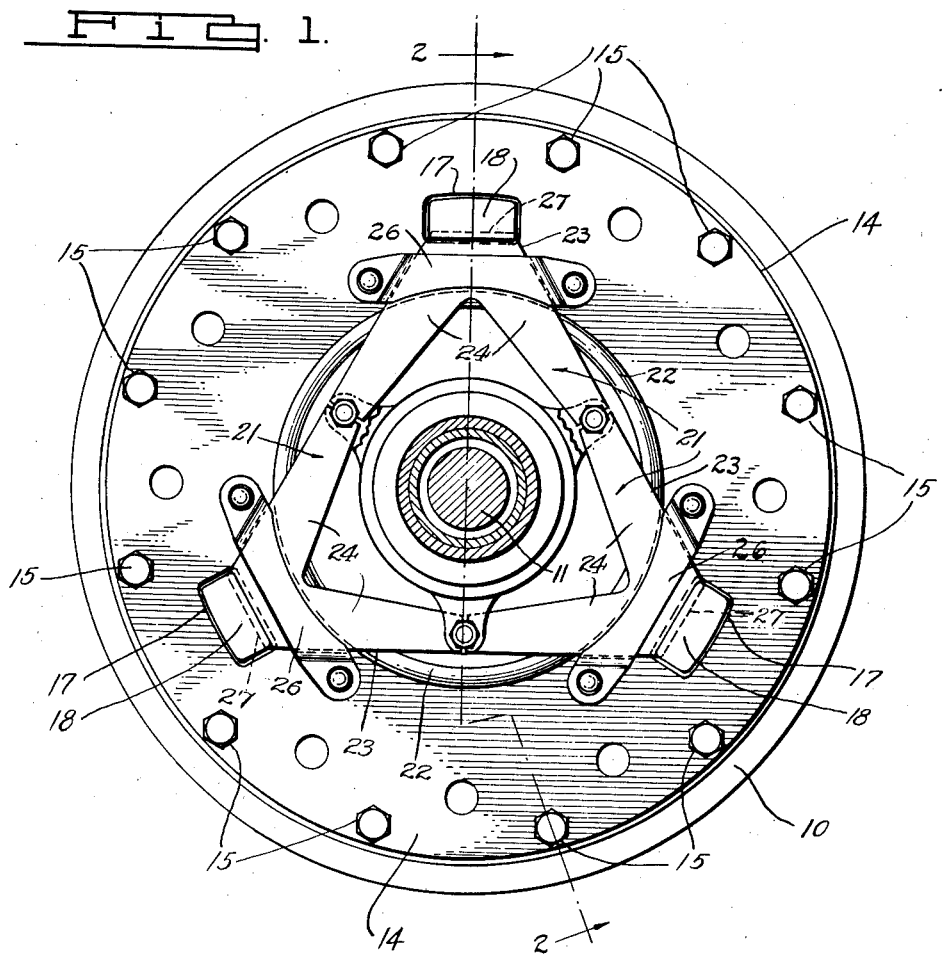

Aug. 30, 1932.　　　　　J. O. FINK　　　　　1,874,268
CLUTCH
Filed Jan. 20, 1931　　　2 Sheets-Sheet 1

INVENTOR.
James O. Fink
BY
ATTORNEY.

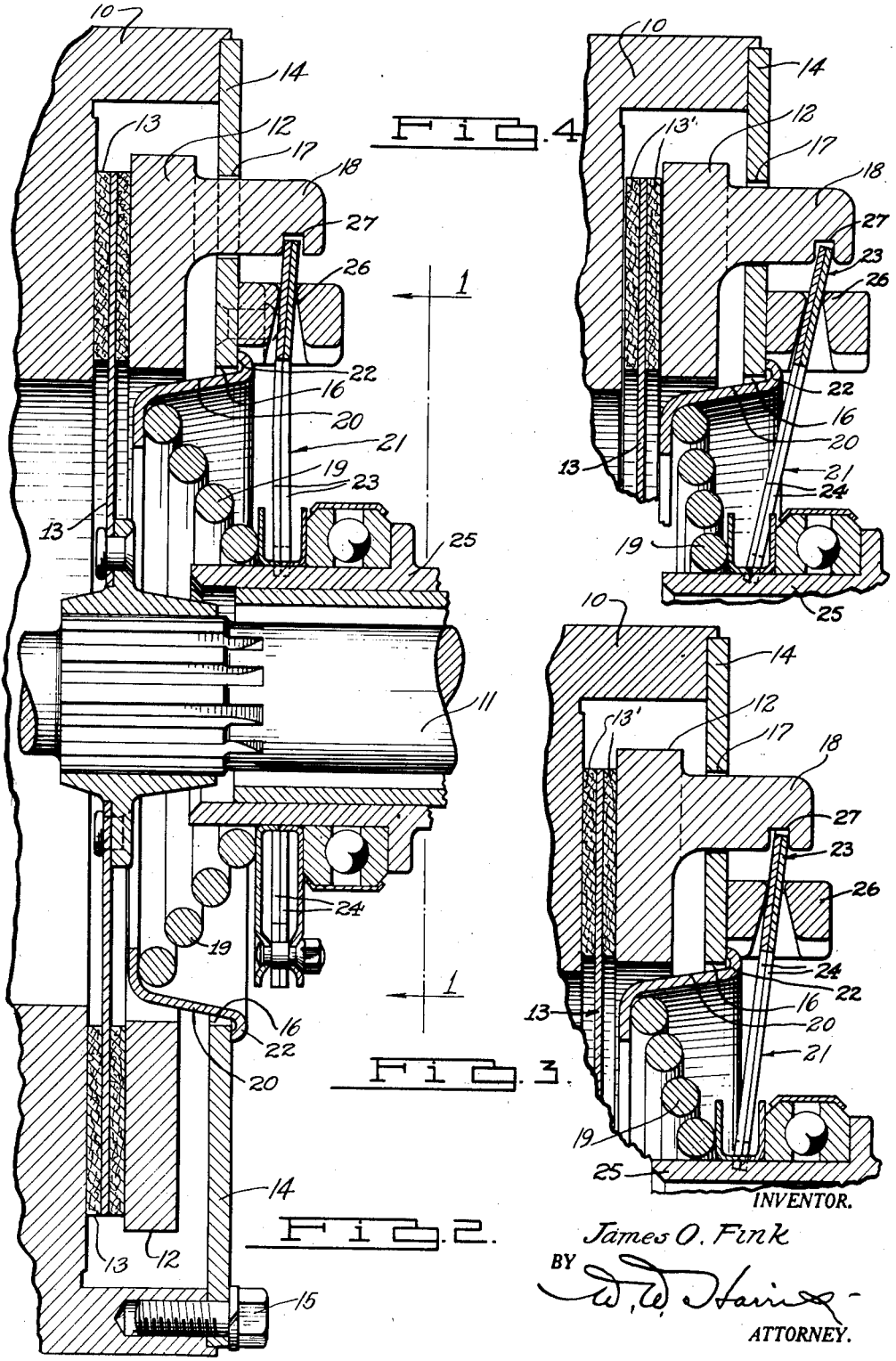

Patented Aug. 30, 1932

1,874,268

UNITED STATES PATENT OFFICE

JAMES O. FINK, OF DETROIT, MICHIGAN, ASSIGNOR TO CONTINENTAL MOTORS CORPORATION, OF DETROIT, MICHIGAN, A CORPORATION OF VIRGINIA

CLUTCH

Application filed January 20, 1931. Serial No. 509,974.

My invention relates to clutches for use in automobiles and other like vehicles and more particularly relates to the clutch construction.

Clutches in general consist of many parts which necessitate the employment of many tools and special machines for manufacturing the same in quantities. With large productions such special tools and machines, can be economically employed for the cost is distributed over such a large number of articles that the cost per article is relatively small. However, where only a relatively small number of articles are to be manufactured the use of special tools and machines is prohibitive because of the expense involved.

An object of my invention is to provide a clutch structure having generally improved clutching characteristics that may be economically produced and distributed in small quantities.

More specifically, it is an object of my invention to provide a clutch structure which may be manufactured with a minimum of special equipment, thereby providing a clutch that can be economically produced in relatively small quantities.

For a more detailed understanding of my invention, reference may be had to the accompanying drawings which illustrate one form which my invention may assume, and in which:

Figure 1 is an elevational view as viewed from the section line 1—1 of Fig. 2 of a clutch constructed in accordance with the principle of my invention, Figure 2 is a longitudinal sectional view thereof taken on the line 2—2 of Figure 1, and showing the clutch parts in full clutching engagement, Figure 3 is a fragmentary sectional view of the clutch illustrating the clutch parts in an intermediate position, and Figure 4 is a similar fragmentary sectional view of the clutch illustrating the clutch disengaged.

In general, a clutch consists of driving and driven members, driving and driven elements respectively connected for driving connection with said driving and driven members, and means for effecting a clutching engagement and disengagement between the driving and driven elements. In the present embodiment of my invention there is provided a driving member or flywheel 10, a driven member or shaft 11, a driving element or pressure plate 12, and a driven element or clutch disc 13, said clutch disc 13 being operatively connected with the shaft 11 and the pressure plate 12 being connected for driving connection with the flywheel 10. A back plate 14 is secured to the flywheel 10 by means of bolts or other fastening devices 15 and cooperates with the flywheel 10 to substantially enclose or house the pressure plate and clutch disc 12 and 13 respectively. Said cover plate consists of a substantially flat ring having a central opening 16 and openings 17 through which driving lugs 18 carried by the pressure plate project. In the illustrated embodiment these lugs are formed integral with the pressure plate but obviously the lugs can be formed of separate pieces and secured to the pressure plate by any suitable means. These driving lugs form a driving connection between the pressure plate and flywheel.

Means are provided for relatively moving the driving and driven elements for effecting a clutching engagement or disengagement. Such means consists of a source of pressure such as the spring means 19, one end of the spring means bearing against a spring abutment 20 and the other end bearing against the inner end of the pressure multiplying lever means 21. The spring abutment is constructed substantially cup shaped and is provided with a flanged rim 22 adapted for an overlapping engagement with the inner edge of the back plate for anchoring the abutment member thereto. (See Figures 2 to 4 inclusive.) The lever means is preferably constructed of pressure multiplying laminated spring levers 23 having forked arms 24 adapted to partially straddle the slidable clutch collar 25, the inner ends of said arms being engaged by said spring means 19 and clutch collar 25. The back plate carries lever fulcruming means 26 which are preferably secured to the back of the back plate and positioned inwardly of the openings 17 therein through which said driving lugs project. Preferably the driving lugs are each provided with a recess 27 adapted for engagement with the outer end of said lever means.

It will be noted that the diverging arms 24 of the lever means are arranged substantially tangential to the clutch collar 25, this construction providing a compact structure capable of assembly within a space of minimum diameter. Although other types of lever means may be satisfactorily employed, I find it desirable to employ a laminated spring lever which provides for a gradual uniformly increasing pressure during the clutching action, since such lever construction lends itself readily to a simplified and compact construction as herein illustrated.

In Fig. 4 the spring 19 is compressed and the clutch elements are disengaged. To engage the clutch the action is as follows. First, as the clutch pedal (not shown) is released the spring 19 expands and moves the pressure plate or driving element 12 and initially engages the flywheel 10 and pressure plate 12 with the driven element or clutch disc 13, but no pressure is as yet applied for effecting a driving engagement. The position of the parts at initial contact is illustrated by Fig. 3. Further expansion of spring 19 causes the pressure multiplying laminated spring levers 21 to flex and thus the pressure is gradually built up and transmitted to said relatively movable clutch elements through the agency of this laminated spring lever means. The laminated spring lever means (which as herein illustrated are three in number) are fulcrumed on the back of the cover plate 14, the outer end of said levers engaging the driving lugs 18 carried by the pressure plate and the inner ends being loaded by said spring means 19, any suitable type of spring loading means being employed. Thus, the pressure applied for effecting a clutch engagement is gradually built up from zero (at initial clutch engagement) to a predetermined maximum, and on clutch disengagement the pressure is gradually decreased from a maximum to zero. This gradual increase and decrease of pressure during clutch engagement and disengagement takes place while the driven disc is in engagement with the flywheel and pressure plate; said disc having mats 13' for effecting a friction engagement with said flywheel 10 and pressure plate 12.

It will be noted, that I have provided a very compact structure that can be readily and economically manufactured with a minimum of special tools and machines and with a minimum of material. Thus a clutch constructed in accordance with the principle shown in the accompanying illustrated embodiment of my invention can be economically manufactured in relatively small quantities and may be placed on the market in competition with other clutches manufactured in relatively larger quantities, which cannot be manufactured as economically in small quantities.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. A clutch having in combination driving and driven members, driving and driven elements respectively connected in driving relation with said driving and driven members, said driving and driven elements movably engageable and disengageable for clutch engaging and disengaging action, a cover plate secured to said driving member and acting in cooperation with the driving member to substantially enclose said driving and driven elements, said cover plate provided with an opening, said driving element having a driving lug arranged to project through said opening, pressure multiplying laminated spring lever means fulcrumed on the back of said cover plate and engaged with the driving lug carried by said driving element, and spring means for loading said lever means.

2. A clutch having in combination driving and driven members, driving and driven elements respectively connected in driving relation with said driving and driven members, said driving and driven elements movably engageable and disengageable for clutch engaging and disengaging action, a cover plate secured to said driving member and acting in cooperation with the driving member to substantially enclose said driving and driven elements, said cover plate provided with an opening, said driving element carrying an integrally constructed driving lug arranged to project through said opening, pressure multiplying laminated spring lever means fulcrumed on the back of said cover plate and engaged with the driving lug, and spring means for loading said lever means.

3. A clutch having in combination driving and driven members, driving and driven elements respectively connected in driving relation with said driving and driven members, said driving and driven elements movably engageable and disengageable for clutch engaging and disengaging action, a substantially flat cover plate secured to said driving member and acting in cooperation with the driving member to substantially enclose said driving and driven elements, said cover plate provided with an opening, said driving element having a driving lug arranged to project through said opening, pressure multiplying laminated spring lever means fulcrumed on the back of said cover plate and engaged with the driving lug, and spring means for loading said lever means.

4. A clutch having in combination driving and driven members, driving and driven elements respectively connected in driving relation with said driving and driven members, said driving and driven elements movably engageable and disengageable for clutch engaging and disengaging action, a cover plate consisting of a flat ring secured to said driving member and acting in cooperation with the driving member to substantially enclose said driving and driven elements, pressure multiplying laminated spring lever means operatively connected with said driving element, spring means for loading said lever means, and a spring abutment member anchored to said flat ring.

5. A clutch having in combination driving and driven members, driving and driven elements respectively connected in driving relation with said driving and driven members, said driving and driven elements movably engageable and disengageable for clutch engaging and disengaging action, a cover plate consisting of a flat ring secured to said driving member and acting in cooperation with the driving member to substantially enclose said driving and driven elements, pressure multiplying lever means operatively connected with said driving element, spring means for loading said lever means, and a spring abutment member having a portion constructed to overlap said ring to anchor the spring abutment member, said abutment member overlapping said driving element axially of said driven member.

6. A clutch having in combination driving and driven members, driving and driven elements respectively connected in driving relation with said driving and driven members, said driving and driven elements movably engageable and disengageable for clutch engaging and disengaging action, a cover plate consisting of a flat ring secured to said driving member and acting in cooperation with the driving member to substantially enclose said driving and driven elements, pressure multiplying lever means operatively connected with said driving element, spring means for loading said lever means, and a spring abutment member having a portion constructed to overlap the inner edge of said ring to anchor the spring abutment member, said abutment member overlapping said driving element axially of said driven member.

7. A clutch having in combination driving and driven members, driving and driven elements respectively connected in driving relation with said driving and driven members, said driving and driven elements movably engageable and disengageable for clutch engaging and disengaging action, a cover plate consisting of a flat ring secured to said driving member and acting in cooperation with the driving member to substantially enclose said driving and driven elements, pressure multiplying laminated spring lever means operatively connected with said driving element, spring means for loading said lever means, and an outwardly cup-shaped spring abutment having a rim portion constructed to overlap the inner edge of said ring to anchor the spring abutment member, said abutment member overlapping said driving element axially of said driven element and terminating short of said driven element.

8. A clutch having in combination driving and driven members, driving and driven elements respectively connected in driving relation with said driving and driven members, said driving and driven elements movably engageable and disengageable for clutch engaging and disengaging action, a cover plate consisting of a flat ring secured to said driving member and acting in cooperation with the driving member to substantially enclose said driving and driven elements, pressure multiplying laminated spring lever means operatively connected with said driving element, spring means for loading said lever means, and a spring abutment member having an annular flange arranged for engagement with the rear face of said ring adjacent the inner edge thereof to anchor the spring abutment member, said abutment member telescoped axially of said driven member with respect to said driving element and terminating to the rear of said driven element.

9. A clutch having in combination driving and driven members, driving and driven elements respectively connected in driving relation with said driving and driven members, said driving and driven elements movably engageable and disengageable for clutch engaging and disengaging action, a cover plate secured to said driving member and acting in cooperation with the driving member to substantially enclose said driving and driven elements, said cover plate provided with an opening, said driving element having a driving lug arranged to project through said opening, pressure multiplying laminated spring lever means, a fulcruming device carried by said back plate and located radially inwardly of the opening in said cover plate, the outer end of said lever means engaging the driving lug, and spring means for loading the inner end of said spring lever means.

10. A clutch having in combination driving and driven members, driving and driven elements respectively connected in driving relation with said driving and driven members, said driving and driven elements movably engageable and disengageable for clutch engaging and disengaging action, a cover plate secured to said driving member and acting in cooperation therewith to substantially enclose said driving and driven elements, said cover plate provided with an opening, a driving lug carried by said driving element and projecting through said opening, pressure multiplying laminated spring lever means having inwardly extending forked arms, fulcruming means carried by said back plate and located radially inwardly of the opening in said cover plate, and spring means for loading the inner ends of the forked arms of said laminated spring lever means.

11. A clutch having in combination driving and driven members, driving and driven elements respectively connected in driving relation with said driving and driven members, said driving and driven elements movably engageable and disengageable for clutch engaging and disengaging action, a cover plate secured to said driving member and acting in cooperation therewith to substantially enclose said driving and driven elements, said cover plate provided with an opening, a driving lug carried by said driving element and projecting through said opening, pressure multiplying laminated spring lever means having inwardly extending forked arms, fulcruming means carried by said back plate, and spring means for loading the inner ends of the forked arms of said lever means.

12. In a clutch, the combination of a driving flywheel and driven shaft, a driven disc carried by said shaft, a pressure plate around the shaft, a back plate secured to said flywheel and cooperating therewith to substantially house the driven disc and pressure plate, said pressure plate operatively connected with said flywheel, lever means fulcrumed on said back plate and operatively connected with said pressure plate, spring means for loading said lever means, and an abutment member for said spring means, said abutment member anchored to said back plate and overlapping said pressure plate axially of said shaft.

13. In a clutch, the combination of a driving flywheel and driven shaft, a driven disc carried by said shaft, a pressure plate around the shaft, a back plate secured to said flywheel and cooperating therewith to substantially house the driven disc and pressure plate, said pressure plate operatively connected with said flywheel, lever means fulcrumed on said back plate and operatively connected with said pressure plate, spring means for loading said lever means, and an outwardly cupped abutment member for said spring means, said abutment member anchored to said back plate and overlapping the pressure plate axially of said shaft.

14. In a clutch, the combination of a driving flywheel and driven shaft, a driven disc carried by said shaft, a pressure plate around the shaft, a back plate secured to said flywheel and cooperating therewith to substantially house the driven disc and pressure plate, said pressure plate operatively connected with said flywheel, lever means fulcrumed on said back plate and operatively connected with said pressure plate, spring means for loading said lever means, and a spring abutment member anchored to said back plate and overlapped with respect to said pressure plate axially of said shaft and terminating to the rear of said driven disc.

15. In a clutch, the combination of a driving flywheel and a driven shaft, a driven disc carried by said shaft, a pressure plate around the shaft, a back plate secured to said flywheel and cooperating therewith to substantially house the driven disc and pressure plate, said pressure plate operatively connected with said flywheel, pressure multiplying laminated spring lever means fulcrumed on said back plate, spring means for loading said lever means, and an abutment member for said spring means, said abutment member anchored to said back plate and overlapping said pressure plate axially of said shaft.

16. In a clutch, the combination of a driving flywheel and driven shaft, a driven disc carried by said shaft, a pressure plate around the shaft, a back plate secured to said flywheel and cooperating therewith to substantially house the driven disc and pressure plate, said pressure plate operatively connected with said flywheel, pressure multiplying laminated spring lever means fulcrumed on said back plate, spring means for loading said lever means, and an abutment member for said spring means, said abutment member overlapped radially with respect to said back plate to anchor same thereto and overlapping the pressure plate axially of said shaft.

17. In a clutch, the combination of a driving flywheel and driven shaft, a driven disc carried by said shaft, a pressure plate around the shaft, a back plate secured to said flywheel and cooperating therewith to substantially house the driven disc and pressure plate, pressure multiplying laminated spring lever means fulcrumed on said back plate, spring means for loading said lever means, and an outwardly cupped abutment member for said spring means, said abutment member anchored to said back plate and overlapped with respect to said pressure plate axially of said shaft.

18. In a clutch, the combination of a driving flywheel and driven shaft, a driven disc carried by said shaft, a pressure plate around the shaft, a back plate secured to said flywheel and cooperating therewith to substantially house the driven disc and pressure plate, pressure multiplying laminated spring lever means fulcrumed on said back plate, spring means for loading said lever means, and an abutment member for said spring means, said abutment member anchored to said back plate and telescoped axially of said shaft with respect to said pressure plate.

19. In a clutch, the combination of a driving flywheel and driven shaft, a driven disc carried by said shaft, a pressure plate around the shaft, a back plate secured to said flywheel and cooperating therewith to substantially house the driven disc and pressure plate, pressure multiplying laminated spring lever means fulcrumed on said back plate, spring means for loading said lever means, and an abutment member for said spring means, said abutment member anchored to said back plate and telescoped within said pressure plate axially of said shaft.

20. In a clutch, the combination of a driving flywheel and driven shaft, a driven disc carried by said shaft, a pressure plate around the shaft, a back plate secured to said flywheel and cooperating therewith to substantially house the driven disc and pressure plate, pressure multiplying laminated spring lever means fulcrumed on said back plate, spring means for loading said lever means, said abutment member anchored to said back plate and telescoped axially of said shaft with respect to said back plate and pressure plate.

21. In a clutch, the combination of a driving flywheel and driven shaft, a driven disc carried by said shaft, a pressure plate around the shaft, a back plate secured to said flywheel and cooperating therewith to substantially house the driven disc and pressure plate, said pressure plate operatively connected with said flywheel, pressure multiplying laminated spring lever means fulcrumed on said back plate, said lever means having inwardly extending forked lever portions, spring means for loading the inner end of said forked lever portions, and an abutment member anchored to said back plate and overlapping said pressure plate axially of said shaft.

In testimony whereof I affix my signature.

JAMES O. FINK.